United States Patent [19]

Runowski

[11] Patent Number: 5,199,172
[45] Date of Patent: Apr. 6, 1993

[54] METHOD OF MANUFACTURING A PINLESS RETAINER FOR A PRIMARY RING

[75] Inventor: Alexandre Runowski, Chicago, Ill.

[73] Assignee: John Crane Inc., Morton Grove, Ill.

[21] Appl. No.: 862,349

[22] Filed: Apr. 2, 1992

[51] Int. Cl.⁵ .................. B21D 53/10; F16J 15/34
[52] U.S. Cl. .................. 29/898.11; 277/96.1
[58] Field of Search ............ 29/888.3, 898.11, 557, 29/558; 277/27, 81 R, 82, 84, 91, 935 D, 96.1

[56] References Cited

U.S. PATENT DOCUMENTS 4,212,475 7/1980 Sedy .................. 277/96.1
4,768,790 9/1988 Wetzel et al. .................. 277/81 R Primary Examiner—Timothy V. Eley
Attorney, Agent, or Firm—Kinzer, Plyer, Dorn, McEachran & Jambor

[57] ABSTRACT

A mechanical seal for use between a housing and a rotatable shaft supported by the housing having adjacent annular primary and mating sealing rings, each ring having a generally radial sealing face and means for sealing and nonrotatably retaining the first sealing ring relative to the housing, and means sealing and nonrotatably retaining the second sealing ring so that it rotates with the shaft. One sealing ring is movable axially of the shaft, and biasing means urge this one ring toward the other sealing ring, which is axially fixed relative to the shaft. The axially movable sealing ring is centered coaxially with respect to the axis of the axially fixed sealing ring through engagement of a centering element which is centered relative to the shaft and which engages the axially movable sealing ring to center it relative to the shaft. The centering element engages the axially movable sealing ring and includes an integral pinless retainer. The retainer means centers, retains and prevents the axially movable sealing ring from rotation relative to the housing. Centering is effected at the periphery of the axially movable ring exposed to the pressurized fluid to be sealed. A method of manufacture of the centering element includes machining or milling or otherwise machining an inside diameter of a centering element to produce a pinless retainer means.

8 Claims, 2 Drawing Sheets

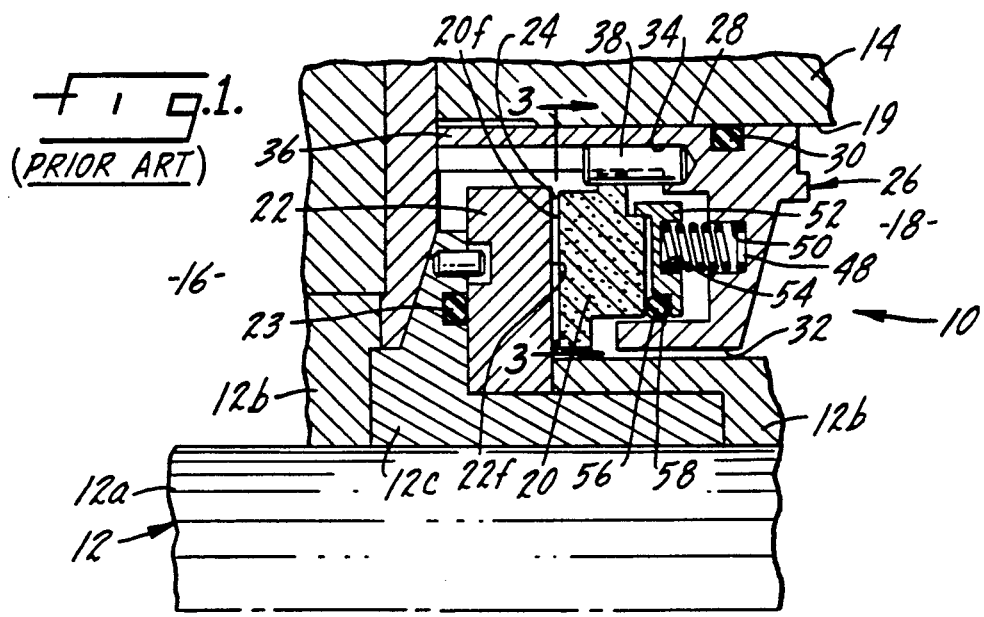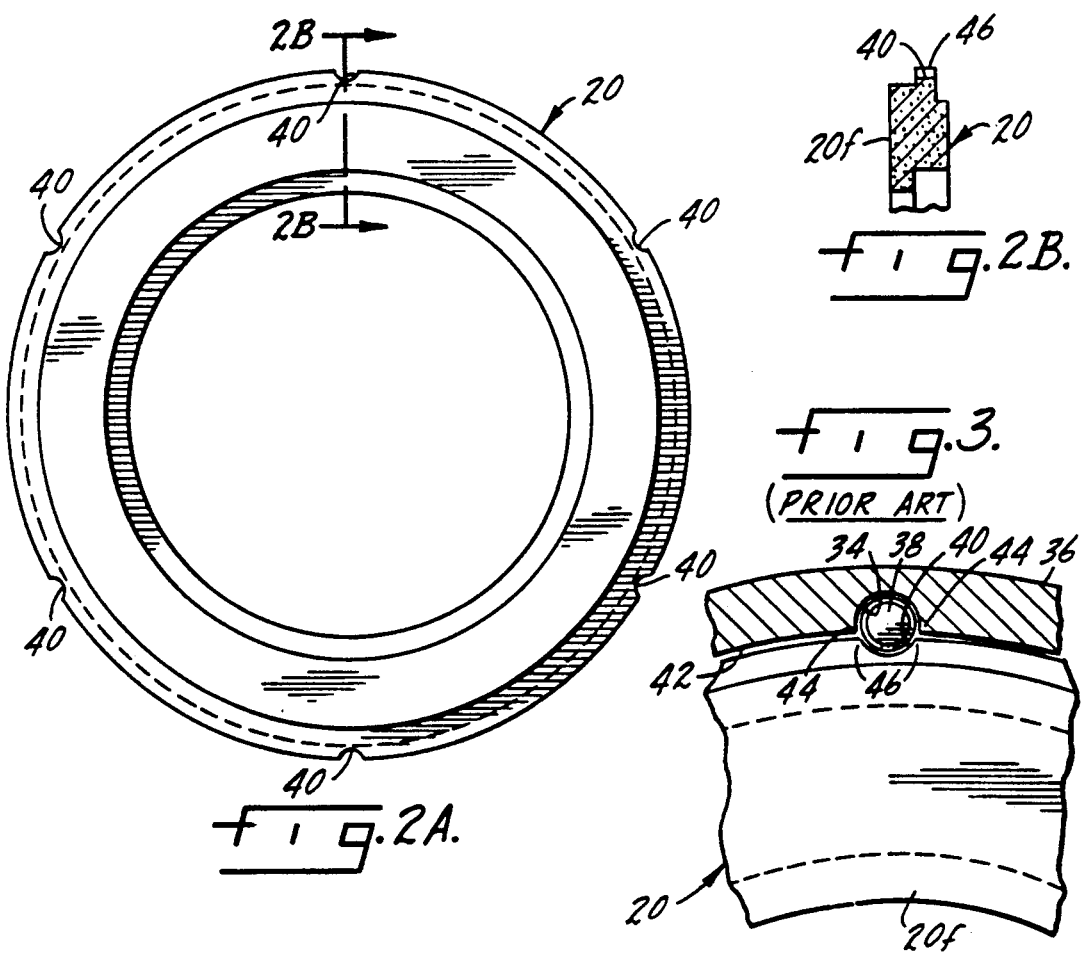

METHOD OF MANUFACTURING A PINLESS RETAINER FOR A PRIMARY RING

FIELD OF THE INVENTION

This invention relates to rotary mechanical seals having relatively rotating annular sealing faces for containing fluid under pressure, between a housing and a shaft that is to be rotated relative to the housing. In particular it relates to such seals having provision to insure pinless retainer means for coaxial disposition of the seal rings.

BACKGROUND OF THE INVENTION

Mechanical seals between a rotatable shaft and its stationary supporting housing, may include annular sealing rings respectively sealed and connected or keyed relative to the shaft and to the housing, and having annular sealing faces disposed facing one another. The relative rotation of the shaft and housing takes place between these sealing faces; and they are adapted to cooperate closely with one another to minimize fluid leakage between the faces, from a high pressure at one radial edge of the sealing faces to a lower or atmospheric pressure at the opposite radial edge.

At least one of the sealing rings generally is movable axially of the shaft, and biased by springs or the like, to urge the annular sealing faces closely proximate, or even substantially against one another, particularly when the shaft is not being rotated. However, to reduce wear between the sealing faces, as they are being moved relative to one another when the shaft is being rotated, it is intended that a small fluid film gap be established between the sealing faces. The gap thickness is determined when the forces acting on the moving ring member balance; such forces include the hydrostatic and hydrodynamic fluid pressure acting on the opposite faces of the member, and the force of the closing spring. The fluid forces may result from the contained fluid, although a secondary lubricating fluid could also be used.

When properly designed, the fluid film gap between the sealing faces may be measured in tenths-of-thousandths of an inch (0.0001"), and the leakage through the gap is minimal. This sealing gap nonetheless eliminates or minimizes direct contact between the sealing faces, to significantly reduce wear of such faces; and further to significantly reduce frictional drag, heat buildup and power consumption of the mechanical seal. Adjacent sealing faces require very close tolerances, and, during operation, the adjacent sealing faces must remain true and parallel relative to one another.

Precise positioning of the seal rings with respect to each other is particularly critical in dry running gas seals. Only the contained fluid itself, typically a gas, is used. Gas generally is not an effective lubricant and improved control of hydrostatic and hydrodynamic forces is relied on to provide a fluid film gap between the sealing faces, so as to avoid direct surface contact of the sealing faces. Even so, the gap between the sealing faces must be very small to contain a gas, without allowing excessive leakage.

A successful design of a dry running seal has a plurality of circumferentially spaced shallow radial grooves provided in one of the sealing faces. These grooves are spirally disposed from the edge of the sealing face that is adjacent the high pressure contained fluid and extend part way across the face toward the edge adjacent the low pressure. The pressure of the contained fluid at the high pressure edge is presented via the grooves to an interior region of the sealing faces, to provide for a hydrostatic pressure tending toward separation of the sealing faces. As the sealing faces rotate relative to each other, the pumping action of the grooves creates a hydrodynamic force that separates the faces to some gap, until the forces are counterbalanced by the forces of the springs and of the opposing fluid forces tending to close the gap. This gap avoids direct contact between the sealing faces. U.S. Pat. Nos. 3,499,653, 4,212,475 and 4,768,790 disclose specific embodiments of mechanical dry running gas seals. All three patents are commonly assigned to the assignee of the present invention and the teachings of these patent, where appropriate, are incorporated herein by reference.

In a mechanical seal of the type disclosed in the above mentioned patents, the sealing and/or film leakage gap is dynamic and changing. When the shaft is not rotating the seal faces are in contact. As the shaft rotates, the pumping action of the seal face grooves causes the faces to move apart thus creating a gap. Other factors such as axial shaft movement, thermal distortion of parts, pressure variations, etc. require that one seal face accommodate axial movement. One sealing ring is, therefore, movable axially along the shaft. As noted, the gap for a dry running seal may be measured in tenths-of-thousandths of an inch (0.0001"), and the movement of the one sealing ring is comparable. Any resistance hindering the movable sealing ring in this very small range detracts from the sensitivity of the mechanical seal. Excessive resistance preventing compensating movement of the movable ring may hold the gap between the sealing surfaces too small, causing wear, overheating and/or even destruction of the adjacent sealing faces; or may keep an open gap from closing, allowing excessive leakage.

Of importance also is the fact that forces on the sealing faces must be reasonably uniform and symmetrical with respect to the sealing faces and to the rotational axis of the sealing faces. This means that the sealing faces must be properly centered relative to one another. If the sealing faces are offset, from a coaxial position, or caused to move out of parallel relative to one another, the sealing faces at one local region may be forced too close together or even to contact one another, while they may be spaced apart excessively at another spaced local region. When the sealing faces are offset, both wear and leakage problems are aggravated. These factors are augmented by any non-coaxial position of the seal rings.

Centering of the relatively rotating sealing rings is important to seal performance and to seal component life. If one ring is disposed in a position offset from the axial centerline of the other, unequal loading can occur, for example, from the fluid pumped between the sealing faces by the spiral pumping grooves.

In prior designs having seals exposed to the high pressure to be sealed at the outside diameter of the seal rings, it has been adequate to center the seal rings at the inside diameter. For operating pressures and temperatures previously experienced, such an approach had been adequate. However, as pressure and temperatures experienced in seal environments have become more severe, an improved means of centering of the seal rings becomes important.

An important consideration in mechanical face seals is the requirement that each ring have a retaining means which prevents its rotation relative to the structure with which that ring is associated. For example, the stationary ring must not rotate with respect to the housing. Similarly, the rotating ring must remain stable with respect to the rotating shaft so that the ring and shaft rotate together.

To insure that each ring is retained in a fixed, nonrotatable position relative to the housing and shaft, respectively, various techniques have been utilized in the prior art. One technique, for example, is a retainer supporting one of the rings with pins extending from the retainer and into the retained ring. The pins engage appropriate keyways either at the edges or in the body of the ring. Pins present a difficulty, however, in that they are assembled as separate parts from the retainer and are apt to become lost or misaligned with respect to the ring and retainer during assembly or disassembly.

One approach to overcoming these difficulties has been to provide plural convex ridges or protuberances on the inside face of the retainer. The ridges then slip into keyway slots machined into the edges of the ring. The ridges provide firm, non-rotational retention of the ring by the retainer through a tight frictional fit in the keyway slots., The retainer itself is directly or indirectly attached to either the housing or the shaft, depending on which of the rings is retained.

SUMMARY OF THE INVENTION

This invention provides for insured coaxial alignment of the relatively rotating sealing rings of a mechanical seal, even at operating conditions experienced in present day seal environments. This is accomplished by providing centering and retainer means for either sealing ring of the seal. These means affect centering adjacent the edge or periphery of the seal ring which is exposed to the high pressure to be sealed. The means for engaging the retainer and ring are unitary or integral with the retainer. The seal is thus centered at installation and the retainer is conformed to the shape of the ring to securely retain the ring. The invention provides a minimum number of separate parts for retaining the sealing ring, thus improving the retention and assembly of the seal.

The present invention provides a mechanical seal for use between a housing and a rotatable shaft, having adjacent annular primary and mating sealing rings, each with a generally radial sealing face. The first sealing ring is sealed against the housing and nonrotatably fixed relative to the housing. The second sealing ring is sealed against and keyed to rotate with the shaft. One sealing ring is free to move axially, and biasing means urge this one ring toward the other ring so that the sealing faces are adjacent each other and urged together during seal operation.

It is a general object of the present invention to provide a mechanical face seal with a means for preventing the rotation of one or both sealing rings relative to either the housing or the shaft of the seal by restraining the ring at an edge while concurrently providing greater strength to the restraining structure than for seals which heretofore have been available.

It is another object of the invention to provide flexibility in the shape and configuration of a restraining means for a ring in a mechanical face seal that restrains the ring from relative rotation while concurrently allowing for several other functions provided by the seal elements.

Still another object of the invention is to provide for a method of manufacturing of a sealing ring restraining element which provides for flexibility in its shape and configuration while simultaneously providing an accurate and tight fit between the restraining element and the sealing ring for preventing the rotation of the ring relative to the restraining element.

According to these and other objects, there is provided a method of retaining a primary ring in a mechanical face seal comprising the step of providing an annular blank including a circumferentially extending ring engagement portion, at least two radially extending side walls, and a central bore defining a circumferentially extending inner diameter portion, which includes an inner diameter wall having a diameter greater than the diameter of the shaft, the ring engagement portion and the inner diameter wall form an annular cavity surrounding the bore, the annular blank including an annular recess within the cavity defined by a recess first wall extending circumferentially from one of the radially extending side walls to a plane normal to the retainer blank axis and disposed intermediate two of the radially extending side walls, the recess being further defined by a radially extending second wall in the plane which extends from the circumferential recess first wall to the inner diameter wall of the outer diameter portion, and further comprises the step of machining the first wall recess in a circumferential direction and retracting the machining tool from the first recess wall at predetermined positions during the machining step so that the recess is indented toward the inner diameter wall of the outer diameter portion except at the predetermined positions, to provide at least one pair of diametrically opposed axially extending ridges formed at the predetermined positions which retain the outer edge portion of the sealing ring.

The manufacturing process provides a metal retainer for a sealing ring of a mechanical face seal, the retainer having a circumferential ring engagement portion including inwardly facing protrusions for engaging matching dents disposed on the outer circumferential surface of the sealing ring, each of the protrusions including equal stress lines in the metal which are concentric to the metal stress lines of the metal in the retainer circumferential engagement portion, and each protrusion further comprising rounded corners at the intersection of the surface of the protrusion with the inner surface of the circumferential ring engagement portion.

BRIEF DESCRIPTION OF THE DRAWINGS

FIG. 1 illustrates a simplified view of a mechanical face seal in cross section including a conventional rotation prevention pin;

FIG. 2A illustrates an elevational view of a primary seal ring utilized in a mechanical face seal;

FIG. 2B is a cross-sectional partial side view of the primary sealing ring of FIG. 2A;

FIG. 3 illustrates a conventional retainer in a cross section taken at a line approximately 3—3 of FIG. 1;

DETAILED DESCRIPTION OF AN ILLUSTRATED EMBODIMENT

Figure 4:
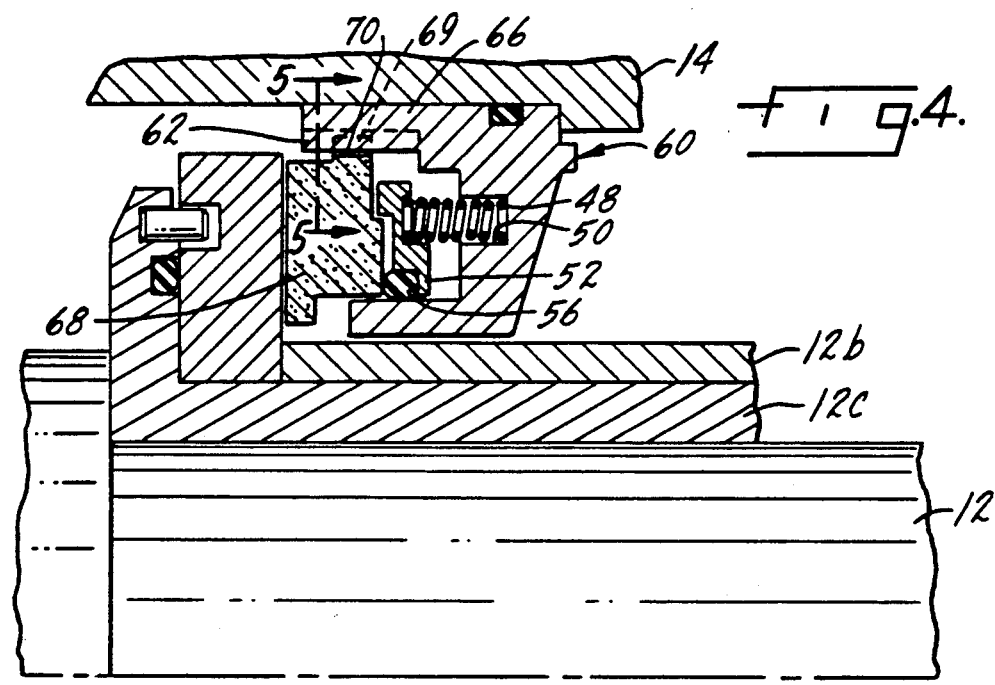
FIG. 4 illustrates an elevational view of a mechanical face seal in cross section including the inventive retainer and primary sealing ring.

FIG. 1 illustrates a known mechanical seal 10 of the type for which this invention forms an improvement. A shaft 12, including a central shaft 12a and sleeves 12b and 12c, is mounted by bearings (not shown) to rotate relative to a housing 14. For purposes of this disclosure, the housing 14 typically will enclose a region 16 on one side of the seal 10 (the inboard side) that may contain a fluid, such as a gas, under high pressure; while a region 18 on the other side of the seal 10 (the outboard side) may be at a substantially lower pressure, or even at atmospheric pressure. An inside cylindrical surface 19 of the housing is concentric to the shaft 12 and the annular space between the shaft 12 and the surface 19 provides a cavity or chamber in which the seal 10 is disposed.

The mechanical seal 10 has a primary sealing ring 20 and an adjacent mating sealing ring 22. The mating ring 22 is secured and coaxially sealed to the shaft 12, to rotate therewith; the primary ring 20 as illustrated is sealed and keyed to the housing 14, and is stationary relative to the housing. Annular sealing faces 20f and 22f are formed on the respective primary and mating rings 20 and 22, symmetrically of the shaft 12, and are adapted to be fit closely adjacent and even substantially flush against one another. The sealing faces 20f and 22f are generally disposed radially of and normal to the shaft 12.

With the primary sealing ring 20 keyed to the stationary housing 14, and with the mating sealing ring 22 keyed to rotate with shaft 12, rotation of the shaft and the mating ring 22 causes the sealing faces 20f and 22f to be moved relative to one another in a direction in line with such faces. In a properly working mechanical seal, this movement occurs across a very small axial clearance gap 24 (although the thickness of the illustrated gap is exaggerated for clarity of disclosure), providing a restricted radial leakage path between the high pressure region 16 and the lower pressure region 18.

For purposes of this invention, no special attention is provided regarding the specific manner of securing and sealing the mating ring 22 to the shaft 12 or how the securing means affects the structure and operation of the conventional mechanical face seal. FIG. 1 shows a pin key securing the mating ring 22 to the shaft sleeve 12c and an O-ring 23 in a groove sealing the mating ring to the shaft sleeve 12c. The specific manner of keying and sealing the primary ring 20 to the housing 14 is also conventional in FIG. 1 and is discussed below in greater detail.

A retainer 26 is axially and nonrotatably secured by conventional means (not shown) in the cavity defined by housing 14 and shaft 12. The retainer 26 has an outer cylindrical surface 28 disposed closely adjacent the inner cylindrical surface 19 of the housing; and an O-ring 30 is compressed in a groove in the retainer outer surface, to define a fluid tight seal between the surfaces 19 and 28. The retainer 26 is thus nominally positioned coaxially of shaft 12. An inner cylindrical surface 32 of the retainer 26 is spaced from the shaft 12, allowing unrestricted clearance between these components in this region.

Referring now to FIGS. 1–3, the retainer 26 also includes a conventional means to inhibit the relative rotation of the primary ring 20 which would result from the friction exerted on face 20f by the face 22f of rotating mating ring 22. These means conventionally take the form of axial extended circumferentially spaced key pin slots 34 in a circumferential ring engagement portion 36 of the retainer 26 which serves to engage the ring 20. Substantially cylindrical key pins 38 are adapted to fit into slots 34 and into correspondingly located grooves 40 formed in the primary sealing ring. The primary sealing ring 20 is thus keyed against rotation relative to the housing 14, while it can be shifted axially relative to the housing 14, and to the shaft 12.

FIGS. 2A and 2B illustrate in greater detail the structure of the conventional primary ring 20 which provides clearer views of the grooves 40 in profile and in partial cross section, respectively. FIG. 3 illustrates in detail one of the key pins 38 and the manner in which the pin 38 fits within a groove 40 in the primary sealing ring 20 and the corresponding key pin slot 34 in the ring engagement portion 36.

The conventional manner of keying the primary ring with key pin 38 t the ring engagement portion 36 includes drilling a hole at the inner surface of the portion 36 to provide a key slot 34. The actual drilling procedure is complicated by the location of slot 34. A close examination of FIGS. 1 or 3 will reveal that the slot is centered at a point which is slightly within the mass of the ring engagement portion 36 and axially parallel to the inner surface 42 of portion 36. The resulting slot 34 in cross section is in a semicircular shape which is somewhat greater than a half circle. The shape having a profile somewhat greater than a half circle results from the off center position of the drilling. In other words, the centerline of the drilled hole of the drilled hole is not precisely positioned on surface 19, but is somewhat displaced toward the body of the ring engagement portion 36. The importance of the location of the drill hole forming slot 34 becomes apparent below in the discussion of the insertion of the key pin 38 into slot 34.

The conventional key pin 38 is inserted carefully within the slot 34 with very little clearance and with a drop or two of adhesive to hold it in place. The off center key slot 34 provides for corners 44 of the portion 36 which are somewhat convergent and which encompass the key pin 34 in some small measure. The corners 44 and the adhesive between pin 38 and slot 34 to some extent are able to retain the pin 38 within slot 34 in conventional seals.

Assembly of the conventional retainer must be performed with great care to avoid malfunction during seal operation. The compression rings 48 are first inserted in spring seats 50. Annular disc member 52 is placed into the cavity formed by the retainer 26 making sure that the opposite ends of springs 48 are within the holding enclosure 54 in disc member 52. The O-ring 56 is then fitted over the retainer inner surface and disposed adjoining the sealing edge 58 of the disc member 52.

The insertion of the conventional primary ring 20 within the cavity formed by the retainer 26 is done with great care to fit the grooves 40 around the key pin 38.

Corners 46 of the ring 20 are oppositely disposed to corners 44 of the ring engagement portion 36 and both sets of corners are separated by a small air gap which provides clearance for axial motion of ring 20 within retainer 26. The inner surface 42 of portion 36 is also separated by a small air gap from the outer circumferences of the ring 20. The air gap provides sufficient clearance for axial movement of the ring 20 within the retainer 26 while concurrently inhibiting the circumferential rotation of ring 20 relative to the retainer 26.

One drawback of the prior art device discussed above is that as the shaft rotates at a great rotational speed relative to the housing, vibration and other transient forces act on the means which inhibit the rotation of the primary ring relative to the retainer. Heat, cold or oversize or skewed holes drilled into the retainer can cause the pin 38 to slip out of the retainer slot 34, especially during axial movement of the ring 20. The pin insertion process is not always performed with the required accuracy, resulting in key pins 38 which are skewed or misaligned relative to the grooves 40 and slots 34. The pins 38 are then subject to transient forces during shaft rotation that affect the operation of the seal and seal faces. Occasionally, the pins become disengaged from the slots and grooves, and may fall between parts which are rotating relative to each other, thus causing catastrophic damage to the seal elements, such as the sealing rings. The damage may be especially severe if the failure takes place during a period when the shaft is rotating at high speed.

One attempt at providing a retainer element tending to overcome the disadvantages of the retainer using key pins 38 has been utilized by the assignee of the present invention. A retainer used according to this method was required to have certain qualities or characteristics, otherwise the method could not be performed. For example, a thin walled circumferential ring engagement portion was required. Other such requirements and the capabilities of retainers according to this previous attempt will become apparent from the description below of the manufacturing process utilized in making the retainers.

The retainer utilized by the assignee of this invention was manufactured by providing a thin walled ring engagement portion in a retainer ring. The retainer wall was marked or spotted at the locations where key pin slots would be scored. A tool with a sharp edge was then placed at the outer wall of the circumferential ring engagement portions and the wall was punched by the sharp edge inwardly to form a groove in the outer wall while simultaneously forming a bump or dent on the inner wall at the marked places. Alternatively, the dents could be formed by a press-forming procedure. A machining procedure was then performed around the circumference of the outer wall to machine the surface below the level of the grooves which provided a smooth outer circumferential wall surface for the retainer.

The manufacturing procedure resulted in an inner wall of the retainer which has an identical number of bumps as there normally would be pins. These bumps could retain the ring in a stationary state and could inhibit the rotation of the ring relative to the retainer. This type of retainer was required to have thin walls to permit the sharp edge tool to dent the surface. The dents or bumps which the sharp edged tool provided were often are not uniform and extra manufacturing steps were required to place the dents into a desirable shape. The pressforming or punching procedure deformed the metal structure and distorted the equal stress lines of the metal. The equal stress lines in the thin walled retainer would then weaken the metal of the retainer at the bumps or dents. Furthermore, the dents formed with corners that are not uniform in cross section required further machining, as did the outer wall of the retainer after the formation of the dents. Moreover, the requirement for very thin walls, which facilitates the formation of the dents, also limits the uses of this type of retainer.

Figures 5, 6:
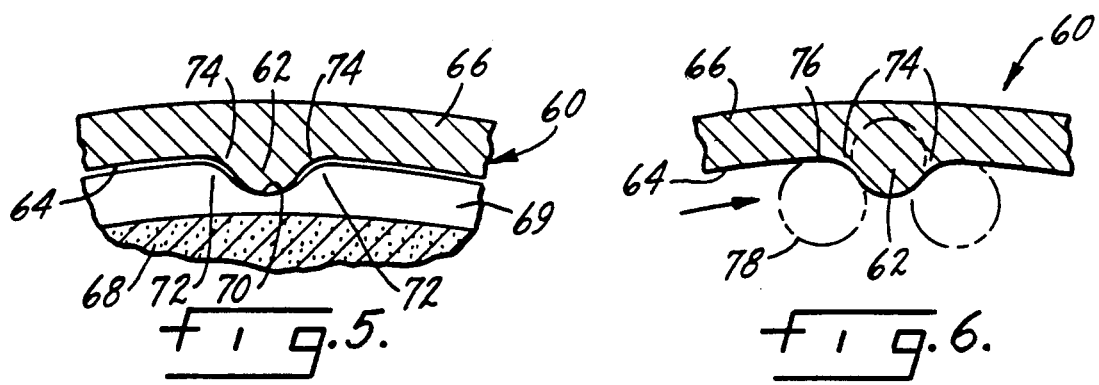
FIG. 5 illustrates a detailed front view of the inventive retainer and primary ring in a partial cross section taken approximately along a line 5—5 in FIG. 4.
FIG. 6 illustrates the method of manufacture of an inventive retainer, including a milling machine drill bit and the milling path necessary for providing a retainer according to the present invention.

FIGS. 4 and 5 illustrate in cross section a retainer 60 according to the present invention in the environment of a mechanical face seal of the gap type. Elements in FIG. 4 have corresponding designation numerals to like elements in FIG. 1 where function and structure are essentially similar. Except for the structure of the retainer and primary ring grooves, the structure and operation of the two seals are otherwise similar.

The structural details which differentiate the inventive retainer 60 from retainer 26 include the elimination of the pin 38. It is replaced by a protuberance or ridge 62 on the ring engagement portion 64 of the retainer 60. One ridge 62 is shown in cross-section in FIG. 4 and again in a side view in FIG. 5. Ridges 62 are in the identical positions where the pins 38 would have occupied around the circumference of the inner surface 64 of the ring engagement portion 66.

An important feature of this device is the parallel relation between the axial dimension of ridges 62 and the center line axis of the retainer 60. This feature provides the advantage that the primary ring 68, which is liable to be displaced in the axial direction relative to retainer 60, will be displaced only in a direction that is parallel to both the axis of the shaft 12 and the axis of the retainer 60.

In contradistinction, the prior art device shown in FIG. 1 includes pins 38. These pins may become misaligned and could impede the free axial displacement of the primary ring 20. Misaligned pins are a major cause of excessive wear on the ring surfaces 20f and 22f and in extreme cases misalignment of pins 38 could destroy the ring or other elements of the seal.

FIG. 5 is a partial view in cross section taken approximately along line 5—5 of the primary ring 68 and the ring engagement portion 64 of FIG. 4. FIG. 5 more clearly illustrates the shape of the ridge 62 and the grooves 70 in the outer edge portion 69 of ring 68. The grooves 70 accommodate and match the ridges 62 of the retainer 60. The shoulders 72 of the ring grooves 70 are rounded, in contrast to the square corners 46 of the prior art device shown in FIG. 3. Similarly, sloping wall portions 74 at either side of the ridges 62 and extending from the inner surface 64 are rounded and match the shape of the shoulders 72 of ring grooves 70.

The rounded shoulders and sloping wall portions 72,74 provide an advantage over the prior art in that the torque and shear forces on the primary ring 68 are alleviated, especially at times of start-up and shut down of the shaft rotation. The sharp corners 44,46 of the prior art device of FIGS. 1 and 3 have been known to chip or become damaged during operation, especially when the pin 38 is misaligned. The primary ring material, normally comprising a refractive metal carbide or ceramic, is prone to sustain damage at the corner 46 under those conditions. The chipped pieces are liable to fall into the seal elements and to cause damage between the relatively moving elements of the seal. The rounded shoulders 72,74 of the inventive device shown in FIG. 5 tend to be less susceptible to damage caused by the shear and torque forces of device during operation, and especially during start-up and shut down. Of equal importance is that the sloping contour of the wall portions 72,74 match each other so that a snug fit is created and that the ridges 62 engage the grooves 70.

Another aspect of the invention is the manufacturing process which results in the inventive structure discussed above. The advantages provided by the inventive manufacturing process is the simplified steps which the invention requires both in the fabrication and in the assembly of the elements of the retainer assembly. The manufacturing process which results in the inventive retainer further provides a much greater degree of flexibility in the dimensions and structure of the retainer and primary rings than the devices heretofore known. This flexibility results from elimination of the punching step on the outer wall of the retainer, which forms the dent or protrusion on the inner wall, thus eliminating the constraint on the thin wall thickness. Flexibility results further because of the elimination of the requirement to machine the outer surface of the retainer after the press-forming or punching step. The inventive process can thus be used to fabricate the retainers 60 for a majority of the shaft diameters with which retainers of this type are presently used.

The preferred method of manufacture is to provide a retainer blank with a thick surface and a smoothly rounded outer wall which has appropriate dimensions that allow the retainer to be inserted into the seal. The retainer blank is manufactured in a conventional manner. An inner wall of the retainer blank must be readied for machining and the retainer blank is clamped into a jig to hold it in place.

Referring now to FIG. 6, a machining procedure is then performed in a circular or semicircular direction around the inner surface 64 of the ring engagement portion 66. The machining procedure is preferably performed by milling the inside surface 64 in circular pattern all around the retainer ring engagement portion 66 in one direction as shown by the arrow. At preselected points in the circular pattern, such as at point 76 in FIG. 6, the milling bit 78 (shown in phantom) begins to move inwardly along a sloping or curving path and toward the center of the blank. The path of milling bit 78 permits a section of the surface 64 to remain as a ridge 62 having rounded sloping walls or shoulders 74. It should be noted that the outline of ridge 62 essentially tracks the outline of the key pin 38 shown in FIG. 3, except for the difference in the shape of the rounded shoulders 74.

Since the milling bit in the milling machine has a cylindrical surface and engages the wall 64 in a semicircle while rotating, the milling procedure leaves a smooth curving surface 64 and a plurality of predetermined spaced ridges 62 which are evenly spaced around the inner wall of surface 64. The radius of the rounded shoulders 74 will be determined by the diameter of the milling bit 78, which preferably is a 0.218 diameter. The total number of ridges 62 around the circumference of the ring engagement portion 66 is preferably six, although any appropriate number is possible. It will be understood, however, that an even number of ridges 62 spaced at regular intervals and having diametrically opposed pairs is preferable.

The outer edge portion 69 of ring 68 is similarly machined or otherwise fabricated to provide grooves 70 having rounded shoulders 72 to match the sloping wall of shoulders 74. The radius of the rounded shoulders 72 is similar to and matches the radius of the shoulders 74 associated with ridges 62. Moreover, the outer diameter of the edge portion 69 is only slightly smaller than the diameter between inner retainer surface 64, thus providing a close fit of the ring 68 within the ring engagement portion 66 of retainer 60. The small gap 24 referred to above with respect to the prior art device illustrated in FIG. 1, also is provided between ring 68 and edge 64, in order to permit a free axial movement of ring 68 within the retainer 60.

Assembly of the retainer 60 and ring 68 is accomplished in a much easier manner than assembly of the prior art device shown in FIG. 1. The assembly begins by placing the retainer on a working surface with the ring engagement portion 64 being the uppermost member. The compression springs 48 are dropped into the evenly spaced spring seats 50 around the retainer. The annular disc 52 is then placed within the cavity and over compression springs 48. The space and diameter of the retainer are then measured and an O-ring 56 of the proper size, and which provides a "squeeze" to the seal, is placed over the disc 52. The inventive primary ring 68 is then dropped over the disc and the O-ring and the assembly is secured for insertion within the housing 14 and around the shaft 12.

The advantage of this assembly procedure over that of the device shown in FIG. 1 is the complete absence of the key pins 38. Because the ridges 62 take the place of the key pins 38, no problem arises with respect to fitting, placement and securing the pins 38 within the semicircular holes 34. Moreover, because the milling procedure is performed in parallel to the axis of retainer 60, the ridges 62 are precisely aligned in the axial direction. Accordingly, the ring 68 will be free to move in the axial direction but in the rotational direction it will be constrained to a position which is stable with respect to the retainer 60. Damage to the ring outer edge portion 69 of ring 68 will be minimized by the rounded corners, and the inventive device will reduce the chance of a catastrophic accident to the seal elements. Finally, a tight fit between the ridges 62 and the grooves 70 provides a greater positive engagement of the ridges within the retainer 60.

Figure 7A:
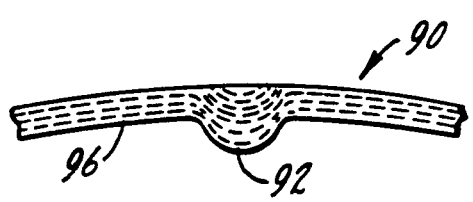
FIG. 7A is a cross-sectional view of a retainer ring which includes a dent punched or pressed into the ring engagement portion of the retainer and which schematically illustrates the equal stress lines in the metal.
Figure 7B:
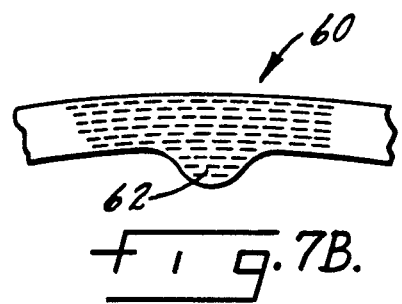
FIG. 7B is a cross-sectional view of the ring engagement portion of the retainer made according to the inventive method and which schematically illustrates the equal stress lines in the metal.

A further advantage provided by the inventive retainer is the shear stress which is inherent in the prior art devices. FIGS. 7A and 7B indicate by dashed lines the equal stress lines which are disposed, respectively, in a retainer 90 which is manufactured by the prior art punching method and the retainer 60 which is manufactured according to the present invention. The equal stress lines of retainer 90 follow the curvature of the ridge 92 and are compressed close together by the punching procedure. The closeness of the equal stress lines results from the punching of the thin wall 96 of the retainer 90 which stretches the wall 96 to provide the ridge 92, and which compresses the material of the wall 96.

In contradistinction, the equal stress lines of the inventive retainer 60 shown in FIG. 7B are concentric with the circumferential outer wall of the retainer 60. The material which forms the ridge 62 thus is more stable and provides a reduced chance of buckling or otherwise failing and also maintains its retention capabilities of the ring which it retains.

It is to be understood that the above description is merely illustrative of the present invention and that many changes and modifications may be made by those skilled in the art without departing from the scope of the following claims.

I claim:

1. A method of manufacture of a positive drive retainer for a sealing ring in a mechanical seal, the mechanical seal sealing a housing and a relatively rotating shaft and including a pair of oppositely facing sealing rings, one of said sealing rings being attached to the housing and the other of said sealing rings being attached to the shaft, the retainer providing a means for sealingly engaging and retaining one of said sealing rings, the improvement comprising a machining step whereby an engagement surface of said retainer is machined to form a substantially annular recess around an inner circumferential wall of the retainer, the circumferential recess wall including a plurality of evenly spaced, diametrically opposed, inwardly projecting ridges for engaging corresponding axial grooves in the sealing ring to be held by the retainer.

2. The method according to claim 1 wherein said improvement further comprises machining only a portion of the inner circumferential wall and providing a smooth surface wall portion for receiving an O-ring between said retainer and said sealing ring held by the retainer whereby the O-ring seals a gap between the retainer and the sealing ring.

3. The method according to claim 1 wherein said machining step further comprises milling the retainer inner circumferential wall.

4. The method according to claim 3 wherein the machining step provides for milling the retainer wall to provide six evenly spaced, diametrically opposed ridges projecting inwardly from the inner circumferential wall.

5. A method of inhibiting relative rotation between a sealing ring and a retainer of a mechanical face seal, the method comprising:
   a) providing a retainer blank having a ring engagement portion;
   b) machining the inner wall of said ring engagement portion to provide ridges axially disposed along the inner wall of said ring engagement portion;
   c) providing axial grooves in the sealing ring having a shape and dimensions matching said axially disposed ridges; and
   d) fitting the sealing ring into said retainer so that said ridges engage said grooves and inhibit relative rotation between the sealing ring and the retainer.

6. A method of manufacturing a positive drive retainer for a ring in a mechanical face seal for sealing a housing and a relatively rotating shaft, the shaft having a predetermined diameter, the seal including a primary sealing ring and a mating sealing ring with opposed radially extending faces, one of said rings being sealingly affixed to the housing and the other ring affixed to the shaft, the method comprising:

providing an annular blank including a circumferentially extending ring engagement portion, at least two radially extending side walls, and a central bore defining a circumferentially extending inner diameter portion, said inner diameter portion having an inner diameter wall with a diameter greater than the diameter of the shaft whereby said ring engagement portion and said inner diameter wall form an annular cavity surrounding said bore, said blank including an annular recess within the cavity defined by a recess first wall extending circumferentially from one of said radially extending side walls to a plane normal to the retainer blank axis and disposed intermediate to said radially extending side walls, the recess being further defined by a radially extending second wall in the plane which extends from said circumferential recess first wall to said inner diameter wall of said outer diameter portion; and machining said first recess wall with a machine tool in a circumferential direction and radially retracting said machine tool from said first recess wall at predetermined positions during said machining step so that said recess is indented toward said inner diameter wall of said outer diameter portion at the predetermined positions, whereby at least one pair of diametrically opposed axially extending ridges are formed at said predetermined positions for retaining the outer edge portion of the sealing ring.

7. The method of manufacturing a positive drive retainer according to claim 1 wherein the machining step is performed by milling said retainer blank recess.

8. The method of manufacturing a positive drive retainer according to claim 7, wherein one of the sealing rings further includes axial grooves equidistantly spaced from each other, each axial groove extending at least partially along an outer edge portion axial surface of said one sealing ring and wherein the machining step further comprises milling said retainer blank to provide three pairs of diametrically opposed, axially extending ridges equidistantly spaced apart from each other, said recess being milled to form ridges which are shaped and dimensioned to engage corresponding said axial grooves in the outer edge portion of the sealing ring which the retainer is adapted to retain.

* * * * *